United States Patent
Kass et al.

(10) Patent No.: US 7,257,945 B2
(45) Date of Patent: Aug. 21, 2007

(54) STRIPPING ETHANOL FROM ETHANOL-BLENDED FUELS FOR USE IN $NO_x$ SCR

(75) Inventors: Michael Delos Kass, Oak Ridge, TN (US); Ronald Lee Graves, Knoxville, TN (US); John Morse Elliot Storey, Oak Ridge, TN (US); Samuel Arthur Lewis, Sr., Andersonville, TN (US); Charles Scott Sluder, Knoxville, TN (US); John Foster Thomas, Powell, TN (US)

(73) Assignee: U T Battelle, LLC, Oak Ridge, TN (US)

( * ) Notice: Subject to any disclaimer, the term of this patent is extended or adjusted under 35 U.S.C. 154(b) by 503 days.

(21) Appl. No.: 10/361,432

(22) Filed: Feb. 10, 2003

(65) Prior Publication Data
US 2004/0154215 A1 Aug. 12, 2004

(51) Int. Cl.
F01N 3/00 (2006.01)

(52) U.S. Cl. .................... 60/286; 60/274; 60/301; 60/303

(58) Field of Classification Search .............. 60/274, 60/286, 301, 303
See application file for complete search history.

(56) References Cited

U.S. PATENT DOCUMENTS

| | | | |
|---|---|---|---|
| 4,340,446 A * | 7/1982 | Crawford | 203/19 |
| 4,403,473 A | 9/1983 | Gladden | |
| 5,189,876 A * | 3/1993 | Hirota et al. | 60/286 |
| 5,522,218 A * | 6/1996 | Lane et al. | 60/274 |
| 5,586,433 A * | 12/1996 | Boegner et al. | 60/274 |
| 5,605,042 A * | 2/1997 | Stutzenberger | 60/286 |
| 5,772,973 A | 6/1998 | Yoshida et al. | |
| 5,806,310 A * | 9/1998 | Daidou et al. | 60/286 |
| 5,976,475 A * | 11/1999 | Peter-Hoblyn et al. | 423/212 |
| 6,006,515 A | 12/1999 | Wakamoto | |
| 6,030,590 A | 2/2000 | Tabata et al. | |
| 6,045,765 A | 4/2000 | Nakatsuji et al. | |
| 6,057,259 A | 5/2000 | Miyadera et al. | |
| 6,066,303 A | 5/2000 | Sudduth et al. | |
| 6,068,670 A | 5/2000 | Haupais et al. | |

(Continued)

FOREIGN PATENT DOCUMENTS

WO WO93/24593 A1 12/1993

(Continued)

OTHER PUBLICATIONS

Murayamama et al. *Mechanism of NOx Reducitionby Ethanol on a Silver-Base Catalyst*, 2001 Society of Automotive Engineers, Inc.

(Continued)

*Primary Examiner*—Thomas Denion
*Assistant Examiner*—Diem Tran
(74) *Attorney, Agent, or Firm*—J. Herbert O'Toole; Nexsen Pruet, LLC

(57) ABSTRACT

A method to use diesel fuel alchohol micro emulsions (E-diesel) to provide a source of reductant to lower $NO_x$ emissions using selective catalytic reduction. Ethanol is stripped from the micro emulsion and entered into the exhaust gasses upstream of the reducing catalyst. The method allows diesel (and other lean-burn) engines to meet new, lower emission standards without having to carry separate fuel and reductant tanks.

3 Claims, 2 Drawing Sheets

U.S. PATENT DOCUMENTS

| | | |
|---|---|---|
| 6,129,773 A | 10/2000 | Killick et al. |
| 6,190,427 B1 | 2/2001 | Ahmed |
| 6,203,770 B1 | 3/2001 | Peter-Hoblyn et al. |
| 6,284,211 B1 | 9/2001 | Miyadera et al. |
| 6,306,184 B2 | 10/2001 | Ahmed |
| 6,327,851 B1 | 12/2001 | Bouchez et al. |
| 6,383,463 B1 | 5/2002 | Mochida et al. |
| 6,415,602 B1 | 7/2002 | Patchett et al. |
| 2002/0104256 A1 | 8/2002 | Yeh et al. |
| 2002/0152745 A1 | 10/2002 | Patchett et al. |
| 2005/0166447 A1 | 8/2005 | Corkwell et al. |
| 2006/0101711 A1 | 5/2006 | Vincent et al. |

FOREIGN PATENT DOCUMENTS

| | | |
|---|---|---|
| WO | WO 02/059236 A2 | 8/2002 |

OTHER PUBLICATIONS

William H. Lane, *The Caterpillar DeNOx Catalyst System*, Caterpillar, Inc.

Niemi et al., *Influence of Hydrocrbons on the Selective Catalytic Reduciton of NOx Over Ag/Al203—Laboratory and Engine Tests*, Lab of Industrial Chemistry Abo Akademi Univ and Volvo Technological Development AB.

Nrel, *Safety and Performance Assessment of Ethanol/Diesel Blends (E-Diesel)* p. ES-1 through R2.

Pure Energy: E-Diesel (Oxygenated Diesel), pp. 1-4.

Hess *MSDS No. 9904*, pp. 1-7.

Pierce Transit: *Detailed Specifications Pierce Transit Diesel Fuel*, 3 pgs.

Chemical and Physical Information: www.atsdr.cdc.gov/toxprofiles.

* cited by examiner

STRIPPING ETHANOL FROM ETHANOL-BLENDED FUELS FOR USE IN NO$_x$ SCR

STATEMENT REGARDING FEDERALLY SPONSORED RESEARCH

This invention was made with United States Government support under Contract No. DE-AC05-00OR 22725 between the United States Department of Energy and UT-Battelle, LLC, and the United States Government has certain rights in this invention.

FIELD OF THE INVENTION

This invention relates to control of pollution from diesel engines and particularly to methods for enhancing the catalytic reduction of oxides of nitrogen by extracting an oxygenate such as ethanol from ethanol-diesel fuel blends (commonly known as E-diesel) for injection into the engine exhaust.

BACKGROUND AND PRIOR ART

Diesel-cycle engines have displaced Otto-cycle internal combustion engines in medium and heavy truck use and are becoming increasingly popular for passenger vehicles. The diesel is inherently more efficient but its lack of responsiveness, its noise and its distinctive odor historically limited its appeal to commercial trucks, traveling salesmen and taxicab fleets. The advent of laws and regulations addressing emissions from "mobile sources" also limited the appeal of diesel cars and light tracks because they were perceived as dirty and regional regulations relating to emissions, especially soot, limited their availability. The Otto-cycle engines were easier to modify to comply with more stringent emissions requirements in part because there are more adjustable parameters and soot is not an issue. Recent advances in fuel injection management in combination with electronic systems have closed the gap but the strategies applied to Otto-cycle engines do not always work with diesels.

Oxygenates such as MTBE and ethanol are frequently blended into gasoline to meet air pollution regulations. Ethanol is preferred because it is a renewable resource, is less toxic and politically popular since it is home-grown and is an added market for farmers (through subsidies). Ethanol is readily blended into gasoline, but is difficult to blend into diesel fuel which has a blend of thousands of paraffinic, naphthalenic and aromatic hydrocarbons ranging in carbon numbers between 10 and 22.

Control of emissions from heavy duty diesel trucks and urban buses has become more stringent in recent years and will become more stringent in 2004, when emissions of oxides of nitrogen (NO$_x$) must be reduced to 2.0 g/bhp-hr and in 2007 when NO$_x$ will be reduced to 0.2 g/bhp-hr. To achieve the latter levels and to allow for improved particulate matter (soot) traps and NO$_x$ catalysts, ultra low sulphur fuel (15 ppm) will be phased-in in 2006. Alternative fuel blends and efficient catalysts will be required.

WO 93/24593 discloses a stabilized, auto-igniting alcohol-containing fuel for use as a diesel fuel having 20 to 70% by volume lower order alcohol (ethanol), 30 to 80% by volume diesel fuel, 4.5 to 5.5% by volume higher order alcohol surfactant, 1 to 15% of a tertiary alkyl peroxide, 3% alkyl peroxide and 0.05 to 0.1% by volume of an anti-clogging additive.

U.S. Pat. No. 6,068,670 discloses an emulsified fuel including water which is more stable than that disclosed in French patent application serial number 2 470 153 which included water and ethanol and was deemed to be unstable on storage.

U.S. Pat. Nos. 6,190,427 and 6,306,184 disclose an E-diesel fuel which is believed to be a product commercially available at this time. The fuel contains 3 to 18% ethanol, 6.5 to 10% of a stabilizer (ethoxylated fatty alcohols), and the remainder commercial No. 2 diesel oil. Optionally, an alkyl ester of a fatty acid and a cosolvent may be added.

U.S. published patent application 20020104256 is directed to the addition of oxygenates to ultra low sulphur automotive diesel oil (ULSADO), the form which will be required by 2006. Accepting the presumption that oxygenates reduce the production of particulates (soot), the reference discloses the use of oxygenates which are saturated, monohydric alcohols having 4 to 20 carbon atoms.

WO 02/059236 discloses compositions to stabilize hydrocarbon fuel over a range of alcohol and water concentrations as an emulsion and includes three different non-ionic surfactants. Optionally, a cetane improver may be employed.

A persistent problem for lean-burn engines such as diesel engines has been production of oxides of nitrogen, typically a mixture of NO and NO$_2$ most frequently referred to as NO$_x$. While oxides of sulphur can be reduced by using ULSADO, the primary source of NO$_x$ is nitrogen in the air and the higher temperatures of lean burn engines exacerbates an already known problem. Catalysts will be required.

Methods are known to reduce NO$_x$ to N$_2$ and H$_2$O. The most established methods use ammonia, isocyanic acid or precursors such as urea. Representative examples are U.S. Pat. Nos. 6,203,770; 6,066,303; and 4,403,473 and published patent application 20020152745.

Ammonia is a viable and affordable method for controlling NO$_x$ at fixed sources but is impractical for mobile sources, especially mid-sized and compact cars. The proven methods require introduction of the reductant upstream of the reducing catalyst, require separate storage of fuel and reductant, thereby requiring inter alia, separate fueling streams.

An alternative reducing system uses hydrocarbons as the reductant. The hydrocarbon may be separate from the diesel fuel as disclosed in U.S. Pat. No. 6,006,515 and in SAE Paper No. 2000-01-2823, or a slip stream from the fuel. The disadvantage of such a system is that fuel economy is impacted and the fuel must be carefully metered to avoid hydrocarbon emissions. This approach results in relatively low NO$_x$ conversion compared with other methods A second alternative is the use of ethanol as a reductant. According to U.S. Pat. Nos. 6,030,590; 6,045,765; 6,057,257; 6,129,713 and 6,284,211 as well as SAE paper 2001-01-1935, the ethanol is introduced between the engine exhaust valve and the catalyst, which is taught to be a silver-based compound. The Caterpillar Inc. DeNO$_x$ catalyst system, available since 1996, uses such a protocol. The use of ethanol, a liquid, is less difficult to utilize than ammonia systems, but still requires a separate tank and a duel fueling capacity at fueling stations.

There remains a need to develop an efficient system for NO$_x$ control in a single ULSADO fuel.

BRIEF DESCRIPTION OF THE INVENTION

It is an object of this invention to provide a means for reducing harmful NO$_x$ emissions in diesel exhaust. It is a further object of this invention to use a single fuel for both the power source and for the control of $NO_x$ using selective catalytic reduction (SCR). It is a further objective of this invention to separate components of a commercially available diesel fuel to maximize fuel economy and emissions control.

These and other objectives are obtained by providing a method for distilling (stripping) a portion of an oxygenate such as the ethanol in E-diesel and injecting the extracted oxygenate into the exhaust stream downstream of the exhaust valve but upstream of the SCR catalyst. Advantageously, the stripping of the oxygenate may be accomplished using heat from the diesel engine cooling system and manifold vacuum to lower the distillation temperature of the ethanol (non-turbocharged engines).

DETAILED DESCRIPTION OF THE INVENTION

Commercial E-diesel such as that available from Pure Energy Corporation contains approximately 15% ethanol, 1.5% a "proprietary additive" designed to stabilized the fuel and 80-84% low sulphur No. 2 diesel. ASTM standard D975 specifies minimum standards for "diesel fuel," including boiling point ranges. Accordingly to the standard for low sulphur No. 2, 90% of the fuel must distill between 282 and 338° C. Typically, the majority boils between 250 and 300° C. Ethanol boils at 78.5° C. at 760 mmHg. It has been found by experiment that 90% of the included ethanol can be stripped from E-diesel (containing No. 2 diesel fuel) at a temperature of 80° C. This final product contains approximately 95% by volume ethanol and 5% by volume hydrocarbon components. Since both ethanol and light hydrocarbons are effective reductants using available SCR catalysts, the stripped mixture need not be chemically pure to reduce $NO_x$.

Suitable selective catalyst reducing (SCR) materials suitable for use with ethanol (reductant) include alumina-supported tin or tin oxides as disclosed in U.S. Pat. No. 6,030,590 and silver based catalysts as described in U.S. Pat. Nos. 6,045,765; 6,057,259; and 6,284,211 and in SAE papers 2000-01-2813 and 2001-01-1935, all incorporated herein by reference. However, because catalyst materials need to be developed in association with the reductant type, different fuel-borne reductants (i.e. propane, butane, etc.) would likely require other catalyst formulations for optimal $NO_x$ conversion.

The chemical process whereby NO and $NO_2$ are reduced on catalysts have been studied but a series of actual steps has been postulated only. Multiple steps are known to be involved and they have been shown to vary by type of catalyst, type of support, chemical nature of the reductant and temperature of the catalyst. An excellent review is R. Burch et al., *Applied Catalysis B: Environmental* 39, 283 (2002). Each control system of SCR and reductant must be optimized to maximize $N_2$ yield while minimizing $N_2O$ (a potential greenhouse gas) and $NH_3$. Optimization includes matching the amount of reductant to the concentration of $NO_x$ in the exhaust at a given time and maintaining the temperature of the SCR catalyst to maximize conversion to $N_2$. The inherent difficulty in reducing the $NO_x$ lies in the fact that modern compression ignition internal combustion engines operate using the lean-burn principle to maximize fuel economy and the exhaust gas contains an excess of oxygen (5-8%) so that the reduction must take place in a nominally oxidative (not reducing) atmosphere. Hence, multiple processes occur on or near the catalyst and oxides are inevitably included in the process which must be carefully controlled to limit or eliminate conversion to gaseous NO, $NO_2$, or $N_2O$.

Figure 1:
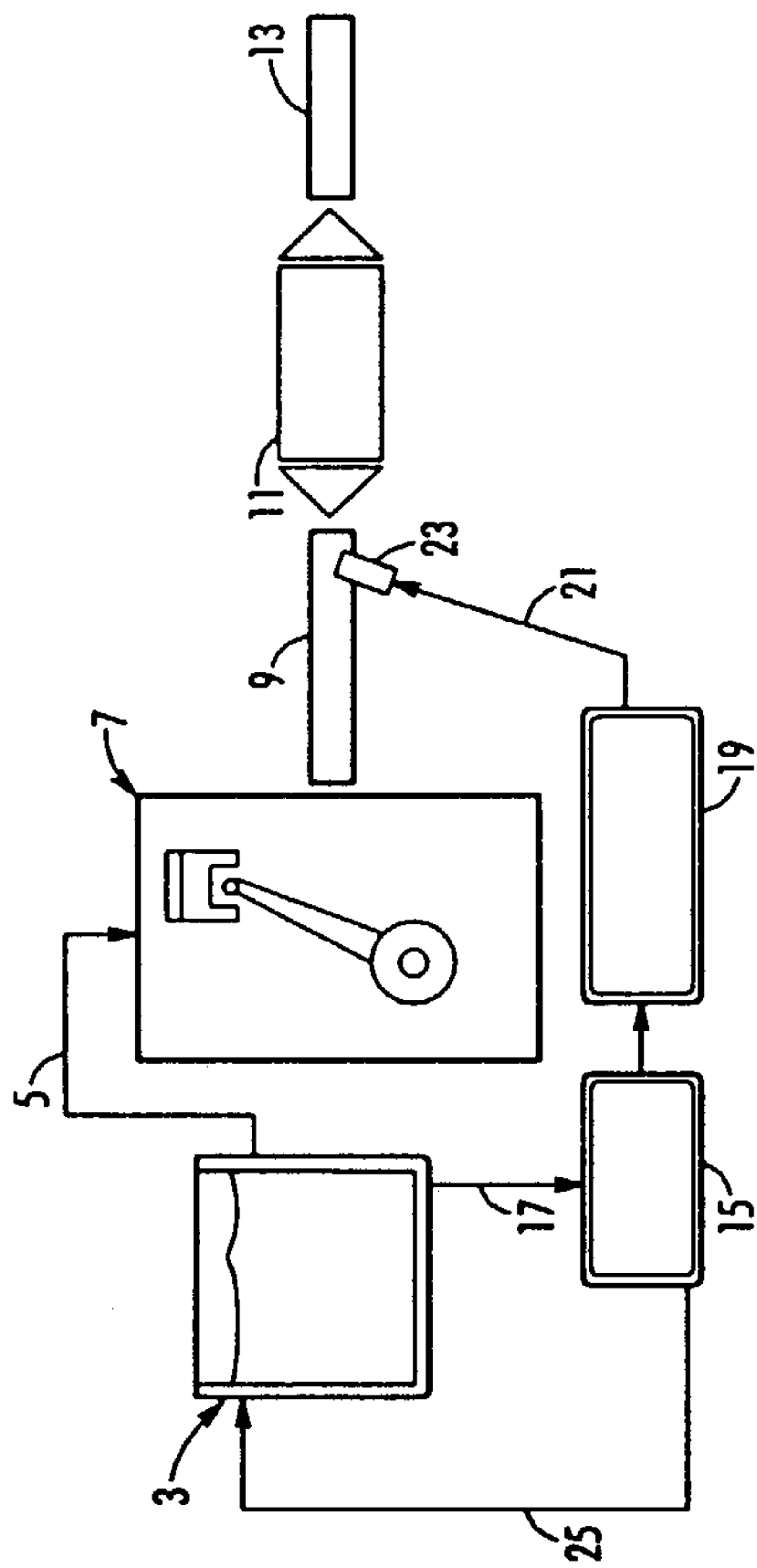
FIG. 1 is a schematic of the basic components of the invention.

FIG. 1 is a schematic showing the basic components of the system. E-diesel fuel in tank 3 is normally delivered by fuel line 5 to engine 7. Exhaust 9 is directed by a header to a catalyst bed 11 and discharged through tailpipe 13.

A distillation chamber 15 is connected to tank 3 by line 17. The distillation chamber is connected to a stripped ethanol receiver 19 from which it is metered through line 21 to injector 23 in the exhaust header. The residue from distillation is returned to fuel tank 3 through return line 25.

The distillation chamber or still 15 may be a single metallic chamber heated by engine coolant, by a mantle containing a resistance wire heater or by a tubular resistance heater immersed in the fuel. A short packed column and a condenser would connect to receiver 19. In this mode the batch distillation could be repeated periodically based on engine hours or the level of stripped ethanol in the receiver.

Figure 2:
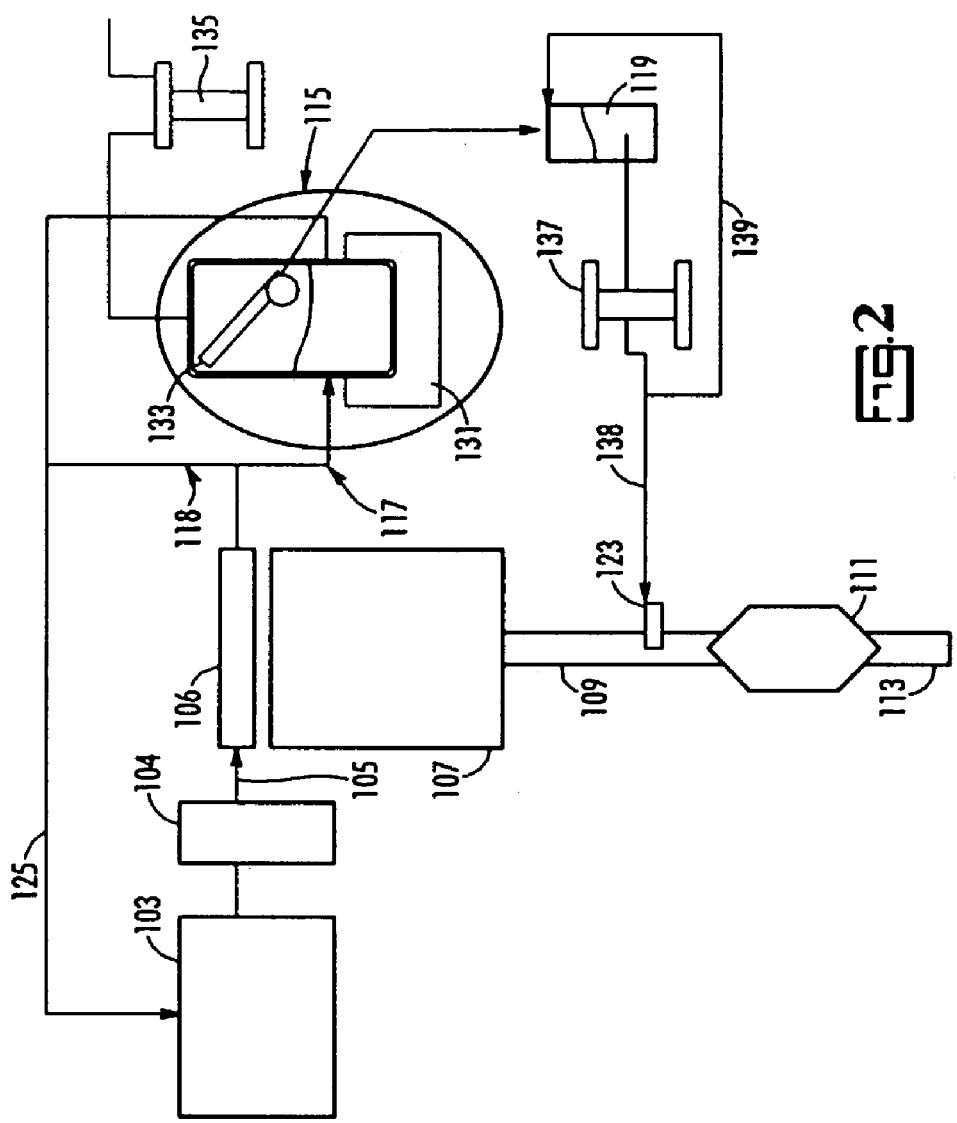
FIG. 2 is a more detailed diagram showing the components.

Advantage may be taken of the design for fuel systems in modern diesel engines. FIG. 2 illustrates the components in greater detail. Fuel from tank 103 is pumped through a filter/heater 104 which warms the fuel using re-circulated engine coolant and removes particulates. The fuel is then delivered through fuel line 105 to pressurized fuel rail 106 from which it is injected into the engine 107. The exhaust 109 may or may not pass through a turbocharger (not shown) to catalyst bed 111 before passing through tailpipe 113. Fuel exiting the rail 106 is split into a return line 118 and a sample line 117. The return line 118 circulates fuel through line 125 back to tank 103. The feed line 117 carries fuel to distillation chamber 115. A heater 131 which may be electric or use circulated coolant (or both) fractionates the fuel into a primarily ethanol fraction and a diesel fraction. The ethanol-rich fraction is condensed using condenser 133 and directed to receiver 119. The residue is returned to the tank 103 through return line 125.

When manifold vacuum is not regularly available, an electric vacuum pump 135 may be used to reduce the heat requirement for distillation.

A float or other sensor in receiver 119 may be used to start and stop the stripping process such as by turning off heat to heater 131, adjusting the split between lines 117 and 118 or by returning stripped ethanol to the main tank 103. A small electric pump 137 pressurizes lines 138 to ethanol injection 123. A recirculating line 139 may circulate ethanol back to receiver 119.

The stripped ethanol may be injected into the exhaust near the exhaust port or downstream, near the catalyst bed. For diesel engines equipped with exhaust gas recirculation, the downstream location is preferred for greater control of the $NO_x$:EtOH ratio. In the preferred embodiment, means such as a water jacket may be used to protect the injector from heat damage.

There are currently 17 different test cycles in use to test emissions from diesel-powered vehicles. All involve engine or chassis dynamometers and are designed to duplicate operational cycles such as the Orange County Bus Cycle for transit buses. Europe currently has five test cycles; Japan four. ISO 8178 is used for some off-road certifications. The AVL 8-mode heavy-duty cycle is a steady-state engine test procedure designed to correlate closely with the emission results obtained using the U.S. FTP transient cycles for heavy duty trucks using an engine dynamometer. The AVL 8-mode is a weighted average of eight different combinations of engine speed and load and provides results more conveniently than the FTP transient protocol.

The amount of ethanol required to sufficiently reduce $NO_x$ emissions over a catalyst depends on the $NO_x$ flux which, in turn, is dependent on the engine operating regime. Engine experiments showed that 3 (or more) parts ethanol is required to reduce 1 part $NO_x$ (mole: mole basis). Using AVL 8-mode as a guideline, then approximately 39 ml of ethanol is required for 1000 ml of fuel. This means that approximately 4% of the ethanol in a 15% E-diesel fuel is required for proper mass balance. This results in 11% of the original ethanol being unused by the SCR system and therefore consumed by the engine from a 15% blend.

In actual use, it is envisioned that a dynamic ethanol injection system would be employed based upon various engine parameters such as intake air flow, fuel mixture richness, operating temperature and ultimately, a $NO_x$ sensor in the exhaust.

The data would be processed utilizing available computer processors and adjustable parameters changed accordingly to optimize efficiency. Since it is necessary to control the temperature of the catalyst under various load conditions but especially at idle and start-up, the reductant may be used to provide heat through combustion in the exhaust under lean conditions. An ignition source such as a spark plug or glow plug may be used for this purpose to initiate burning of some of the reductant to provide such heat. Optionally, an oxidizing catalyst may be used between injector and SCR catalyst to increase the heat and to control the amount of oxygen in the area of the SCR catalyst.

A microemulsion was formed using No. 2 diesel fuel, ethanol (15% by vol.) and a proprietary additive (1.5%) available from G. E. Betz, Trevose Pa. prepared according to WO 02/059236 (incorporated herein by reference). The mixture was splash blended to form the emulsion, and transferred to a still. A vacuum of 200 mm Hg was applied and the still heated to 80° C. (liquid temperature). The distillate was collected as a dual phase and the percentage of ethanol determined volumetrically to be greater than 98% pure when approximately 3% of the total volume was stripped; with further distillation, 90% of the available ethanol can be obtained at 95% purity. When the process was repeated using an ultra-low sulfur diesel fuel (ECD-1) under the same conditions, the distillate was collected as a single phase which indicated that the purity of the distilled ethanol was close to that of the original untreated form.

The invention has been described with reference to preferred and alternative embodiments of the invention using ethanol as the primary example. Modifications and alternatives to the invention will occur to those skilled in the art and it is intended that all such modifications and alterations fall within the scope of the invention and claims.

We claim:

1. A method to deliver a stripped ethanol reductant from E-diesel fuel to the exhaust of lean-burn engines and having a selective catalytic reducing converter in an exhaust system comprising:

delivering an E-diesel fuel to a distillation chamber where a portion of the included reductant ethanol is distilled out from the fuel under reduced pressure and subsequently delivered to a small storage tank;

pressurization of the distilled reductant via fuel pump and a return-style regulator;

injecting stripped reductant to said exhaust via standard fuel injector that is cooled via a water loop to prevent thermal damage to the injector.

2. A method according to claim 1 wherein the reductant is delivered to the exhaust in gaseous form.

3. A method according to claim 1 wherein the lean-burn engine is a diesel engine.

* * * * *